Nov. 13, 1951  W. B. PUTORAK  2,575,294
SECTIONAL BAKING PAN
Filed Feb. 6, 1950

Walter B. Putorak
INVENTOR.

Patented Nov. 13, 1951

2,575,294

UNITED STATES PATENT OFFICE 2,575,294

SECTIONAL BAKING PAN

Walter B. Putorak, Philadelphia, Pa.

Application February 6, 1950, Serial No. 142,584

1 Claim. (Cl. 220—23.4)

This invention relates to the class of kitchen utensils, and more particularly to a sectional baking pan for use in baking pies and the like.

An object of the invention resides in the provision of a sectional pan having individual sections each of which is adapted to contain a separate and individual portion of pie, pudding, or other foods or confections, the individual sections being interlocked to form a single unitary pan to facilitate handling and cooking but being selectively detachable from the entire pan so that the serving of one or more of the individual portions contained in the sections do not affect the remaining portions.

A further object of the invention resides in the provision of a baking pan wherein the conventional wedge-shaped sections of pie or like foods may be readily individually served without permitting the oozing of the pie filling or the like from the remaining portion of foodstuffs.

Still another object of the invention resides in the provision of a sectional baking pan having a plurality of interlocking sections which may be selectively secured to form a circular pan or, as desired, may be interlocked to form a longitudinally extending pan for easier handling in large baking ovens.

A further object of the invention resides in the provision of novel interlocking means for securing sections of a sectional baking pan together.

Still further objects of the invention reside in the provision of a sectional baking pan that is strong, durable, highly efficient in operation, simple in construction and design, capable of being securely interlocked, inexpensive to manufacture, and quite pleasing in appearance.

These, together with the various ancillary objects of the invention which will become apparent as the following description proceeds, are attained by this sectional baking pan, a preferred embodiment of which has been illustrated in the accompanying drawings, by way of example, wherein.

Figure 1:
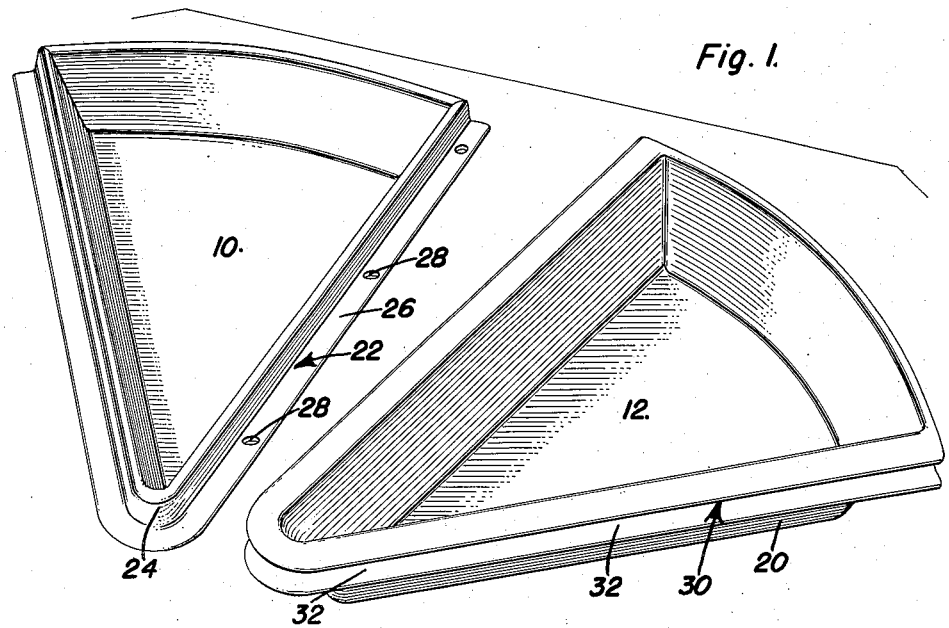
Figure 1 is a perspective view of a pair of interlocking adjacent sections of a sectional baking pan comprising the present invention.
Figure 2:
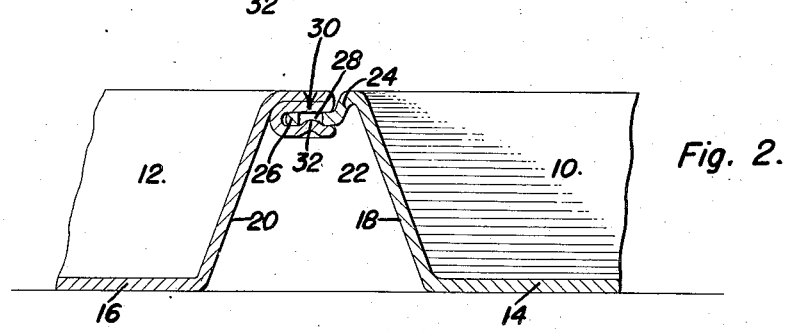
Figure 2 is a vertical sectional detail of the invention showing the interlocking between adjacent sections in greatest details.
Figure 3:
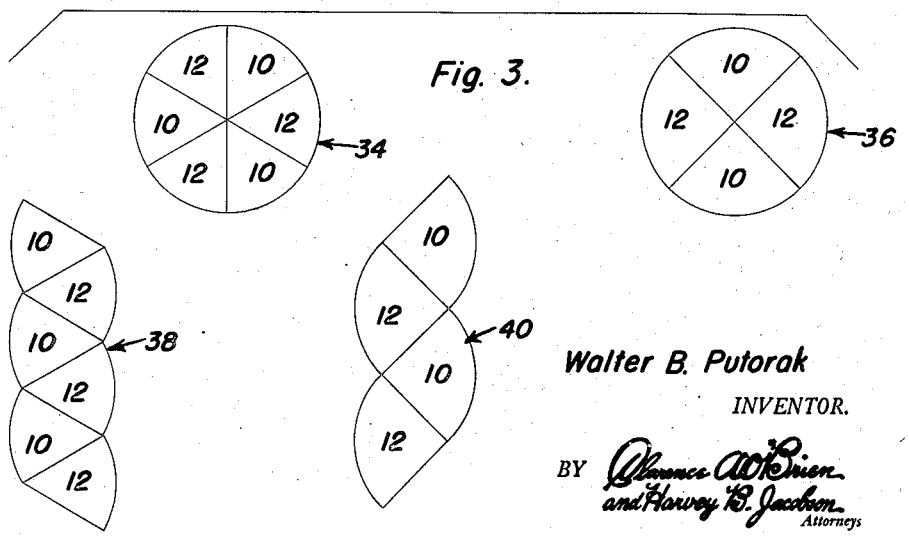

Figure 3 comprises schematic diagrams showing the manner in which sections of the sectional baking pan may be secured together to form either circular or longitudinally extending trays.

With continuing reference to the accompanying drawings wherein like reference numerals designate similar parts throughout the various views, reference numerals 10 and 12 respectively designate wedge-shaped sections of the sectional baking pan to be henceforth more fully described. It is contemplated to form the sections 10 and 12 into either 60° or 90° sectors of a circle so that either four or six sections will form a circular tray or pan.

The sections 10 and 12 in general comprise bases 14 and 16 respectively to which there is secured the downwardly converging side walls 18 and 20. Secured to the upper edge of the side walls 18 of the sections 10 are the male interlocking elements 22 which in general comprise a connecting portion 24 and a tongue 26. The tongue 26 is provided with a plurality of apertures 28 formed therethrough.

Secured to the upper peripheral edge of the side walls 20 is a substantially S-shaped female interlocking element generally designated by the reference numeral 30. The bottom surface of the S-shaped element is crimped upwardly to provide protuberances 32 for interlocking engagement in the apertures 28 formed in the tongue 26.

As can be readily understood, when the male element 22 is positioned to the female element 30, the interlocking elements may be readily interlocked with the protuberances 32 in spring-like engagement in the apertures 28. Upon inspection of Figure 3 it can be seen that the sections 10 and 12 may be arranged in such manner as to form a circular pan such as that indicated at 34 and 36 depending only as to whether the sectors forming the sections 10 and 12 are of 60° or 90°. In like manner longitudinally extending pans such as those indicated at 38 and 40 may be readily formed since such are desirable when the pies are being baked in a commercial baking oven or other large eating and baking apparatus.

Since from the foregoing the construction and advantages of this sectional baking pan are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

Having described the invention, what is claimed as new is:

A sectional baking pan comprising a plurality of sections, each of said sections having the shape of a sector of a circle, an interlocking means on the peripheral edges of said sections, said interlocking means detachably securing said sections together, said interlocking means comprising male and female locking elements formed on alternate sections of said pan, said male locking elements comprising a peripheral tongue on the peripheral edges of one of said sections, said tongue having a plurality of apertures therein, said female locking members comprising a substantially S-shaped member secured to the upper peripheral edge of one of said sections, the bottom portion of said S-shaped members having a plurality of protuberances, said protuberances being engageable in said apertures, said sections being adapted to be selectively interlocked to form a circular baking pan and adapted to be selectively interlocked to form a longitudinally extending sectional baking pan.

WALTER B. PUTORAK.

REFERENCES CITED

The following references are of record in the file of this patent:

UNITED STATES PATENTS

| Number | Name | Date |
|---|---|---|
| 986,395 | King | Mar. 7, 1911 |
| 1,009,334 | Neal | Nov. 21, 1911 |
| 2,065,908 | Pihl | Dec. 29, 1936 |
| 2,074,790 | Hernemann | Mar. 23, 1937 |
| 2,495,132 | Remco | Jan. 17, 1950 |

FOREIGN PATENTS

| Number | Country | Date |
|---|---|---|
| 51,622 | Switzerland | Feb. 7, 1911 |
| 487,391 | France | Apr. 8, 1918 |